US006427038B1

United States Patent
Britz et al.

(10) Patent No.: US 6,427,038 B1
(45) Date of Patent: Jul. 30, 2002

(54) MIRROR CONTROL OF MICRO-ELECTRO-MECHANICAL OPTICAL CROSS CONNECT SWITCH

(75) Inventors: David M. Britz, Rumson; Jeevan Prakash Dodley, Parsippany, both of NJ (US)

(73) Assignee: AT&T Corp, New York, NY (US)

( * ) Notice: Subject to any disclaimer, the term of this patent is extended or adjusted under 35 U.S.C. 154(b) by 80 days.

(21) Appl. No.: 09/639,635

(22) Filed: Aug. 15, 2000

(51) Int. Cl.$^7$ .............................. G02B 6/26; G02B 6/42
(52) U.S. Cl. .............................. 385/18; 385/17; 385/52
(58) Field of Search .............................. 385/16, 17, 18, 385/52; 359/566, 569, 831, 837

(56) References Cited

U.S. PATENT DOCUMENTS 5,420,416 A * 5/1995 Iida et al. ................. 250/201.1
5,903,687 A * 5/1999 Young et al. ................. 385/17

OTHER PUBLICATIONS

Lucent Technologies, http://www.lucent.com/press/0299/990223.blb.html, "Bells Labs scientist unveils "seesaw" optical switch, world's first practical micro–electro–mechanical optical switching technology", Feb. 23, 1989.

* cited by examiner

Primary Examiner—Cassandra Spyrou
Assistant Examiner—Alessandro V. Amari

(57) ABSTRACT

An optical switch includes an input optical fiber, an output optical fiber and a mirror that is either inclinable or rotatable or both and reflects a lightwave signal from the input optical fiber into the output optical fiber. The switch further includes a control circuit to sense a misalignment error and to adjust the mirror to correct the misalignment error. The misalignment error may be either an inclination misalignment error, a rotation misalignment error or both. In an alternative embodiment, an optical switch includes an input optical fiber that includes an input core and an input cladding, an output optical fiber that includes an output core and an output cladding, an input GRISM to insert a calibration signal into the input cladding and a mirror that is adjustable. The mirror reflects a lightwave signal from the input core into the output core and reflects the calibration signal from the input cladding into the output cladding. The optical switch further includes an output GRISM to extract the calibration signal from the output cladding and a control circuit to sense a misalignment error based on the extracted calibration signal. The misalignment error includes an inclination misalignment error or a rotation misalignment error or both. The control circuit includes circuitry to adjust the mirror to correct the misalignment error. In an alternative embodiment, an optical switch includes an input optical fiber, an output optical fiber and a rotatable mirror that has diffraction gratings etched thereon. The mirror reflects a lightwave signal from the input optical fiber into the output optical fiber. The optical switch further includes a control circuit to adjust a rotation angle of the mirror to select a wavelength that can be diffracted into the output optical fiber according to a spacing of the diffraction gratings.

29 Claims, 5 Drawing Sheets

MIRROR CONTROL OF
// MICRO-ELECTRO-MECHANICAL OPTICAL
// CROSS CONNECT SWITCH

BACKGROUND OF THE INVENTION

1. Field of the Invention

The present invention relates to a micro-electro-mechanical optical cross connect switch and, in particular, to a mirror inclination and rotation control for the switch.

2. Description Of Related Art

Micro Electro Mechanical Systems (hereinafter, MEMS) are miniature machines manufactured using silicon integrated circuit fabricating technologies (e.g., with film layers of polycrystaline silicon, silicon nitride and dioxide and gold deposited and patterned) and other technologies that result in miniature mechanically moveable devices. The last step (or latter steps) involve selective etching to remove some material that leaves movable members. For example, a miniature deflectable cantilever member may be manufactured on a substrate so that deflection can be controlled by electrostatic forces. A gold film mirror mounted on the cantilever member can selectably deflect a beam of light.

Scientists "have built a microscopic optical switch that works like a child's seesaw and demonstrates the world's first practical optical-switching technology using micro-electro-mechanical systems (MEMS)," according to one press release titled "Bell Labs scientist unveils 'seesaw' optical switch, world's first practical micro-electro-mechanical optical switching technology," *News & Investor Info Press Release*, Feb. 23, 1999. The "seesaw" of the experimental switch is a tiny, pivoting bar with a gold plated mirror on one end. A lightwave enters the switch from an input optical fiber and exits the switch from an output optical fiber. The input and output optical fibers are co-axially configured with a gap between the ends and the mirrored end of the bar being disposed in the gap. The "seesaw" is normally oriented to permit lightwaves to freely transit from the input fiber to the output fiber. However, to operate the switch, a voltage is applied to the other end of the bar, beneath an attached plate, so that electrostatic forces pull the plate down and lift the mirrored end of the bar so that the mirror interrupts the incoming lightwave before it reaches the output fiber. Such a switch is a single pole, single throw normally closed switch. Other means are known to perform optical switching by moving a mirror into a particular position, either by linear or rotary motor, to reflect an optical beam into a receiving optical fiber.

However, the prior art does not describe a means to adjust the angle of the mirrors to align input and output fibers so as to correct for misalignments that may arise due to manufacturing misalignment and wear.

SUMMARY OF THE INVENTION

It is an object of the present invention to overcome limitations in the prior art. It is a further object of the present invention to adjust the angle of the mirrors in a MEMS optical switch. It is yet another object to measure an output position of a mirror reflected beam to provide mirror adjustment feedback.

These and other objects are achieved in an optical switch that includes an input optical fiber, an output optical fiber and a mirror that is adjustable and reflects a lightwave signal from the input optical fiber into the output optical fiber. In a variant, the switch further includes a control circuit to sense a misalignment error and to adjust the mirror to correct the misalignment error. The misalignment error may be either an inclination misalignment error, a rotation misalignment error or both.

A GRISM is a class of optical devices that combine the physical and spectral dispersion properties of a prism with that of a diffraction grating.

These and other objects are achieved in an alternative embodiment where an optical switch includes an input optical fiber that includes an input core and an input cladding, an output optical fiber that includes an output core and an output cladding, an input GRISM to insert a calibration signal into the input cladding and a mirror that is adjustable. The mirror reflects a lightwave signal from the input core into the output core and reflects the calibration signal from the input cladding into the output cladding. The optical switch further includes an output GRISM to extract the calibration signal from the output cladding. In a variant, the optical switch further includes a control circuit to sense a misalignment error based on the extracted calibration signal. The misalignment error includes an inclination misalignment error or a rotation misalignment error or both. The control circuit includes circuitry to adjust the mirror to correct the misalignment error.

These and other objects are achieved in another alternative embodiment where an optical switch includes an input optical fiber, an output optical fiber and a rotatable mirror that has diffraction gratings etched thereon. The mirror reflects a lightwave signal from the input optical fiber into the output optical fiber. The optical switch further includes a control circuit to adjust a rotation angle of the mirror to select a wavelength that can be diffracted into the output optical fiber according to a spacing of the diffraction gratings.

BRIEF DESCRIPTION OF DRAWINGS

The invention will be described in detail in the following description of preferred embodiments wit reference to the following figures wherein.

DETAILED DESCRIPTION OF PREFERRED EMBODIMENTS

Figure 1:
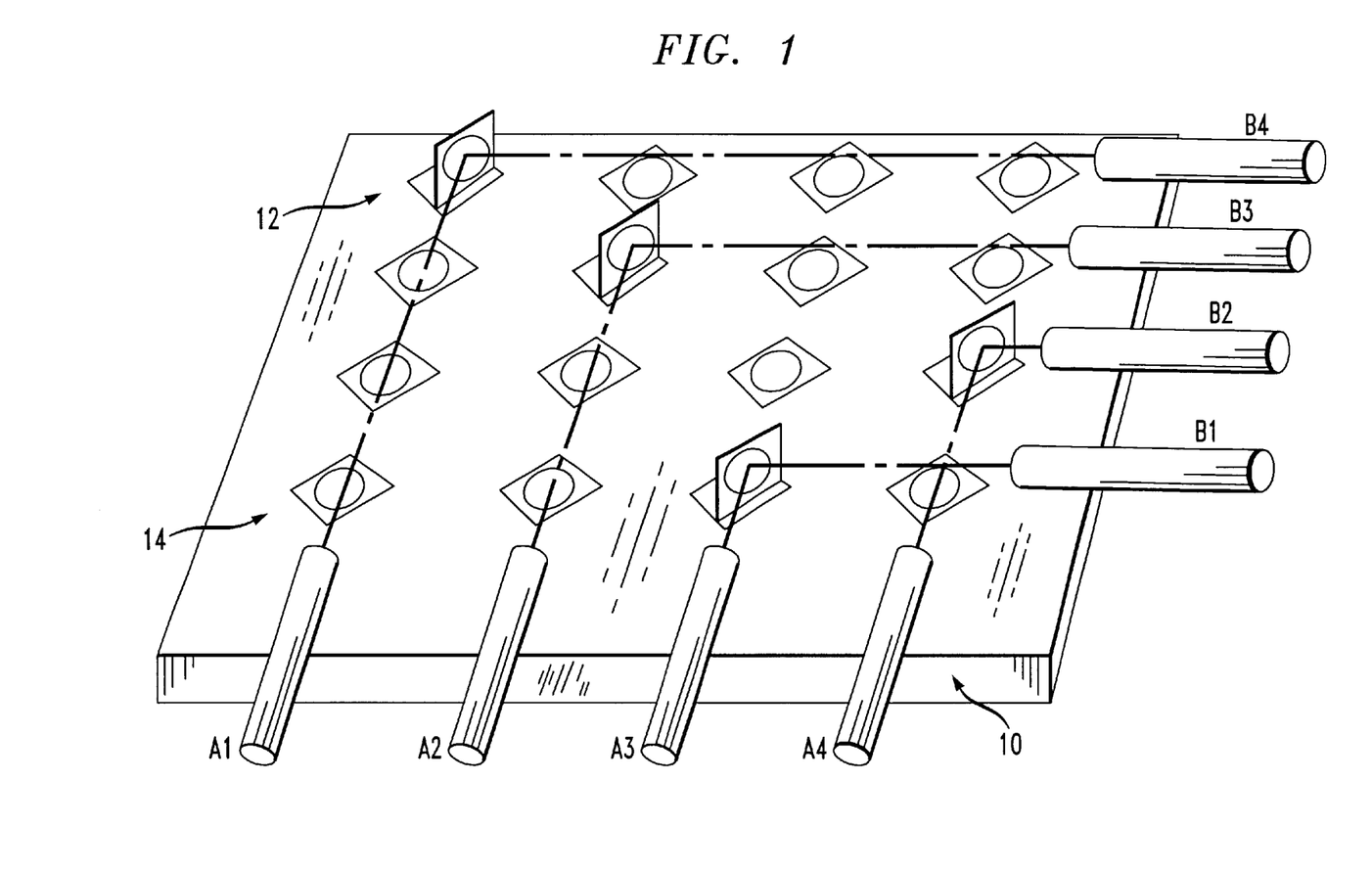
FIG. 1 is a simplified schematic of a 4 by 4 MEMS optical cross connect switch representative of the present invention.

Many types of switches are possible. A cross connect switch has a plurality of inputs that are selectively connected to a plurality of outputs. In FIG. 1, an optical cross connect switch using MEMS technology is depicted where lightwaves enter the switch on a plurality of input optical fibers (A1 through A4) and exit the switch on a plurality of output optical fibers (B1 through B4).

In one particular configuration of such an optical cross connect switch using MEMS technology, an n×n switch is controlled by controlling the orientation of the mirrors. The n×n switch has n inputs (A1 through A4) and n outputs (B1 through B4), and the inputs and outputs to the switch are connected through optical fibers. Any given output fiber of the switch is connected to one input fiber only. The input fiber, A, to the output fiber, B, connection is accomplished by turning OFF all the mirrors except one mirror. In one particular configuration in FIG. 1, a [4×4]MEMS optical cross connect switch is depicted on substrate 10. When a mirror lays flat so that a lightwave can pass over the mirror, the mirror is said to be switched OFF as in mirror 14 depicted in FIG. 1. When a mirror is electrostatically "popped up" to intersect the lightwave, the mirror is said to be ON as in mirror 12 depicted in FIG. 1. Turning mirror 12 ON connects fiber A1 to fiber B4. The one mirror that is ON in the path is oriented to be approximately 45 degrees to the incoming beam such that the exit beam couples to the output fiber optimally. The efficiency of the coupling of the optical beam to output fiber is controlled by the exact position of the ON mirror. The size of the MEMS switch is small, and the input/output fibers are separated by, for example, less than 100 microns. Hence any small misalignment of the ON mirror causes the output fiber to couple inefficiently or, worse yet, the beam couples to an adjacent fiber, possibly causing cross talk. The temperature, aging and repeated usage of the mirror also leads to misalignment.

Figure 2:
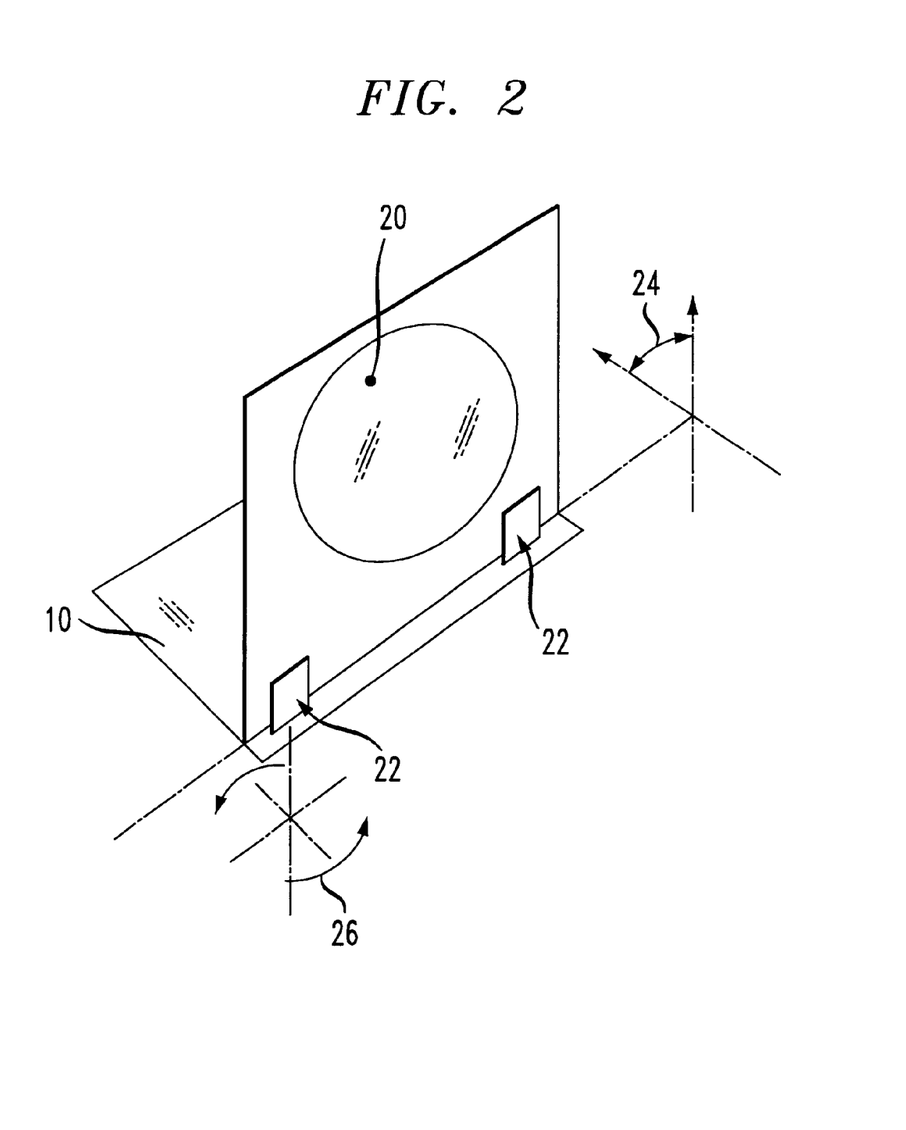
FIG. 2 is a simplified schematic diagram of a single mirror as used in the switch of FIG. 1.

In FIG. 2, mirror 20 is hingedly attached to substrate 10 by hinges 22. Mirror misalignment is caused by MEMS mirror motion errors, namely the inclination error 24 and the rotational error 26. Inclination error 24 refers to the inclination of the mirror with respect to the substrate; this is due to actuator-derived errors and can be a result of aging or contamination of linear motion stage. The rotational error 26 refers to the rotation of the mirror on the substrate plane and can be a result of MEMS hinge-derived errors due to wear or misalignment within manufacturing tolerances. Other errors such as the placement of the mirror on the substrate (manufacturing tolerances), are defined and controlled during manufacturing.

Figure 3:
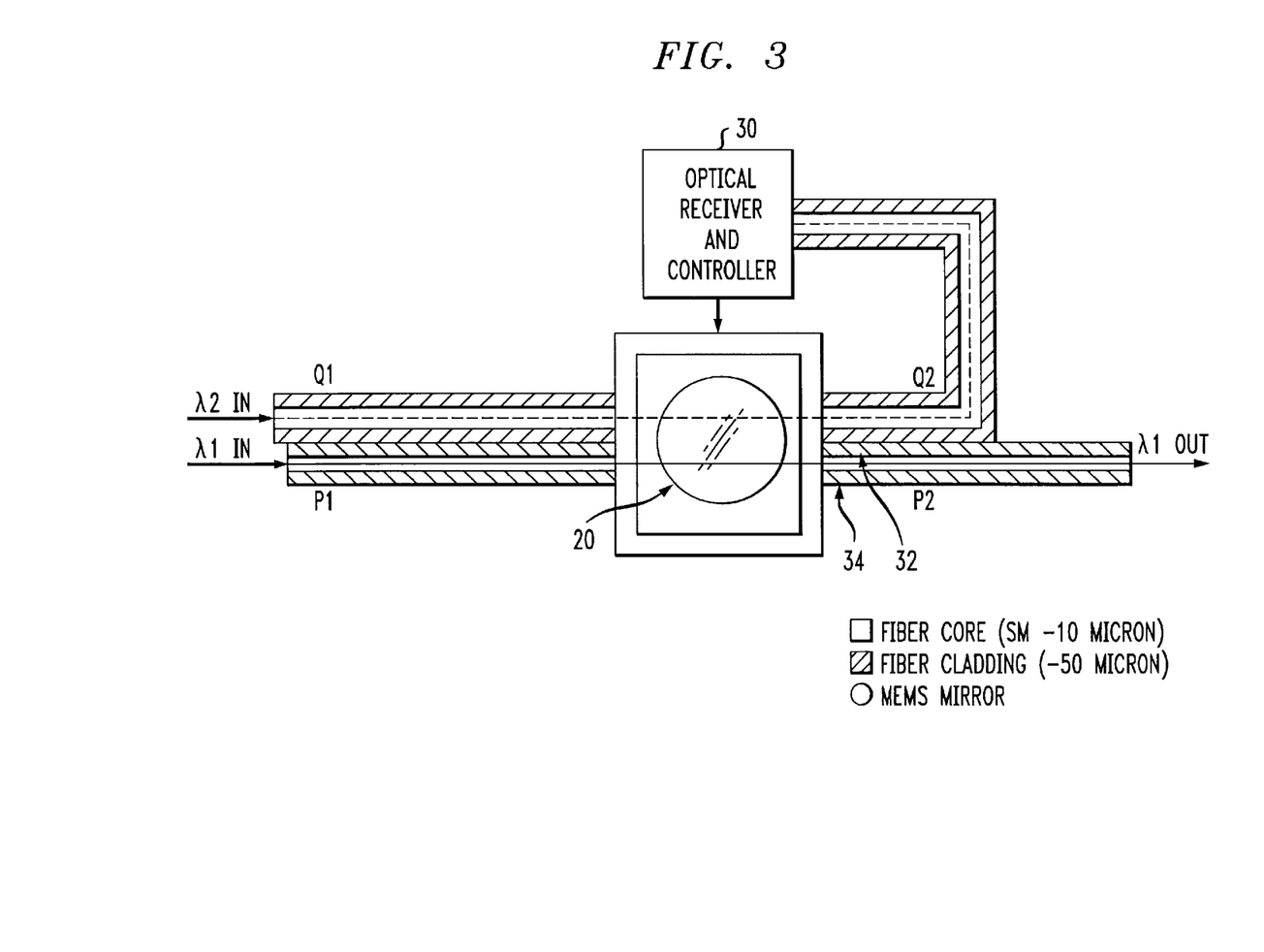
FIG. 3 is a schematic diagram of a cross connect of a practical switch according to the present invention.

In FIG. 3, the lightwave at wavelength $\lambda 1$ carries the information and the lightwave at wavelength $\lambda 2$ is used to aid in controlling the optical mirror. There are two fibers per port at the input and at the output of the MEMS optical switch. Each fiber includes optical transmission core 32 and cladding 34. These two fibers (P1, Q1 at the input and P2, Q2 at the output) are stacked vertically (normal to the substrate) at both the input and output edges of the MEMS switch such that the optical beams sent and received by the fibers in the MEMS switch are parallel (i.e., the beams carrying wavelengths A1 and $\lambda 2$ are parallel). The output lightwave at $\lambda 2$ through fiber Q2 is received in optical receiver and controller 30. The inclination of the MEMS ON mirror is adjusted for optimum optical power received in a closed control loop formed from mirror 20, output fiber Q2 and receiver and controller 30. Receiver and controller 30 determines the inclination angle of maximum coupling. This adjustment is done for fine control. Since $\lambda 1$ and $\lambda 2$ are parallel and the fibers are glued together at the interface, optimal coupling of $\lambda 2$ implies optimal coupling of $\lambda 1$.

In a first variant configuration (FIG. 5), output fiber Q2 has been replaced by two optical fibers Q2A and Q2B, both stacked co-parallel with output fiber P2. Fibers Q2A and Q2B are located at the output of mirror 20 so that Q2A senses when the mirror is over inclined and fiber Q2B senses when the mirror is under inclined. The receiver portion of receiver and controller 30 advantageously includes two optical detectors 30A and 30B to detect the lightwave intensity on fibers Q2A and Q2B, respectively. The controller portion of receiver and controller 30 continuously corrects for the sensed over-inclination and under-inclination.

Figure 5:
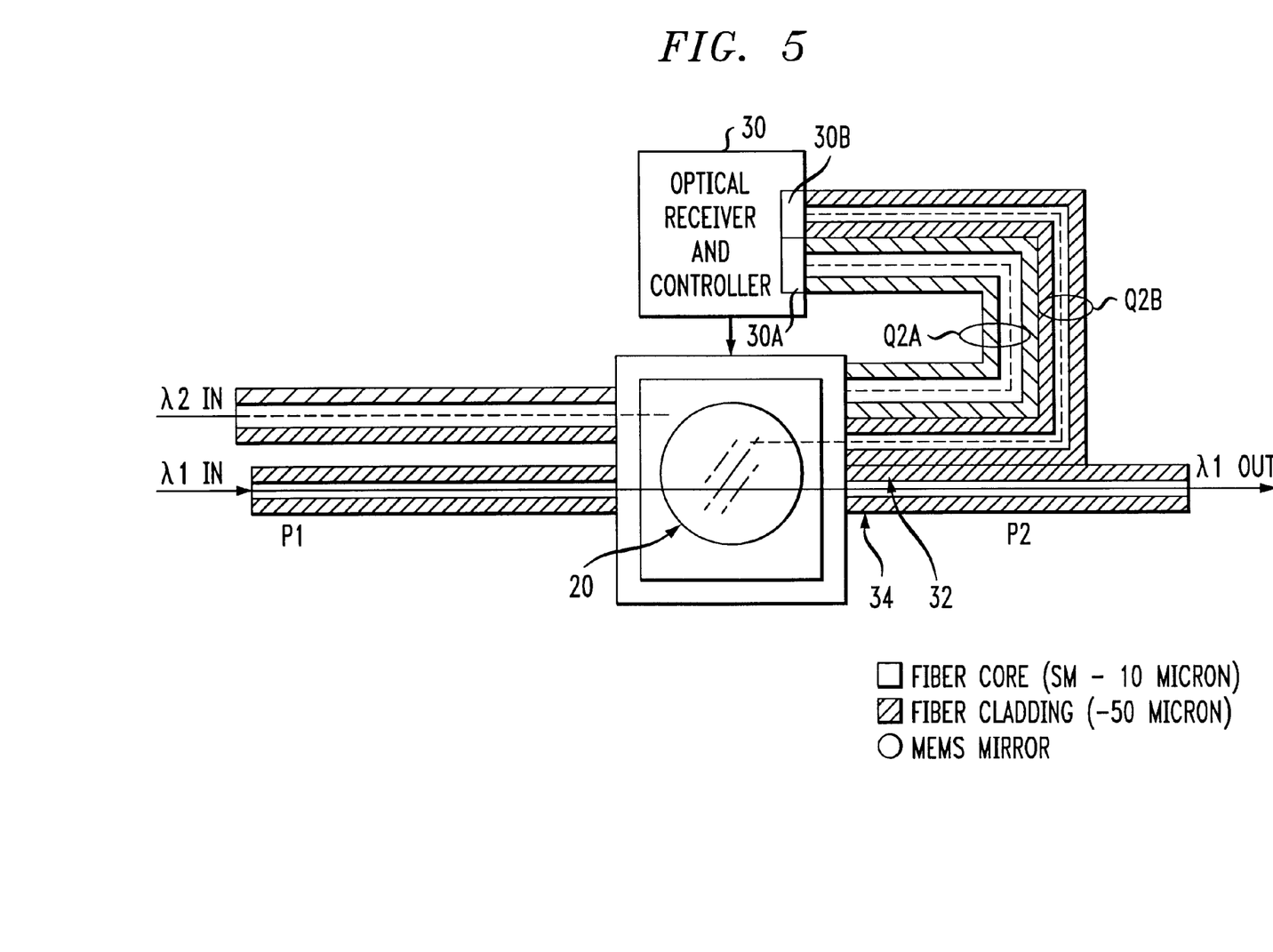
FIG. 5 is a schematic diagram of a variant configuration of the cross connect of FIG. 3.

In another variant configuration, fibers Q2A and Q2B of the first variant configuration are located at the output of mirror 20 so that fiber Q2A senses when the mirror is over-rotated and fiber Q2B senses when the mirror is under-rotated. The receiver portion detects the lightwave intensity on fibers Q2A and Q2B, respectively, and the controller portion continuously senses and corrects over-rotation and under-rotation.

Figure 4:
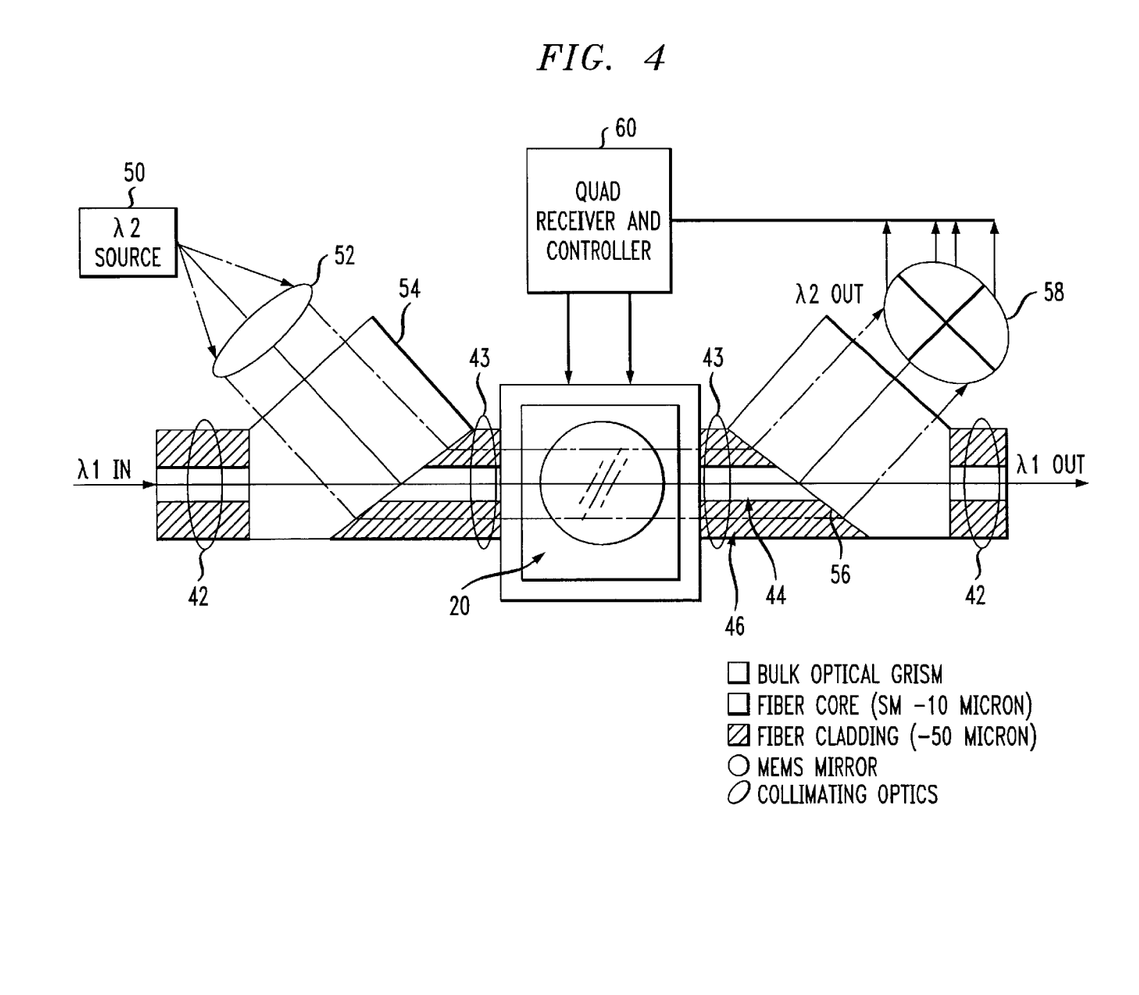
FIG. 4 is a schematic diagram of an alternative cross connect of a practical switch according to the present invention.

In FIG. 4, input and output fiber 42 are standard fibers in dimensions that are known to the industry. Input and output switch fibers 43 include core 44 and cladding 46. Core 44 is preferably of a standard core dimension as in the cores of fibers 42; however, cladding 46 is preferably thicker than claddings of fibers 42. The lightwave at $\lambda 1$ is the signal carried in core 44 and the lightwave at $\lambda 2$ is a calibration signal carried in cladding 46. The enlarged size of cladding 46 enables enhanced calibration signal throughput so as to be better detectable at quad detector 58.

Source 50 generates the calibration lightwave signal at $\lambda 2$ that is focused by optics 52 into GRISM 54. A GRISM is a class of optical devices that combine the physical and spectral dispersion properties of a prism with that of a diffraction grating. The calibration lightwave signal at $\lambda 2$ is diffracted by GRISM 54 to transport the optical signal in cladding 46. Both the calibration signal at $\lambda 2$ and the desired lightwave signal at $\lambda 1$ are emitted from cladding 46 and core 44, respectively, of input switch fiber 43 toward mirror 20. These signals are equally reflected by mirror 20 into the output switch fiber 43. GRISM 56, installed within output switch fiber 43, diffracts the calibration signal and delivers the calibration signal to quad detector 58. Quad receiver and controller 60 processes signals from quad detector 58 and sends commands to adjust the inclination and rotation of mirror 20.

FIG. 4 shows dual axis MEMS mirror control that can be achieved at lower assembly complexity and cost. The calibration signal at wavelength $\lambda 2$ enters into the cladding of the MEMS input fiber through an input GRISM and exits the cladding through an output GRISM at the output side of the MEMS switch. Although some of the calibration signal may enter the core, it reflects internally within the core with such a high angle of reflection that it either (1) leaks into the cladding, or (2) at the point it leaves the input switch fiber toward the folded mirror optical path, it escapes the optical path and never re-enters the output switch fiber.

The GRISMs do not affect the path of the desired lightwave at $\lambda 1$ in the core of the optical fiber because the index of refraction of the core is matched to the index of refraction of the GRISM at $\lambda 1$. The lightwave at A1 transits out of input switch fiber 43 to be reflected at MEMS mirror 20. However, the GRISM grating interface causes the lightwave in the cladding at $\lambda 2$ to diffract enough so that the lightwaves can be detected by a quad detector as shown in FIG. 4, or the lightwaves can be detected by a pixel matrix. Preferably the grating lines are etched into the oblique surface of cladding 46, but are not etched into core 44. A change in the index of refraction between the GRISM and the cladding produces an angle deflection for a calibration signal at wavelength $\lambda 2$. However, the addition of the grating etched into the cladding enhances the angle deflection effect of the change in the index of refraction, allowing the calibration signal at $\lambda 2$ to be split off and routed to quad detector 58 in a shorter distance and thereby allowing easier access of the calibration signal.

The information received by quad detector 58 provides the x and y error information that can be used to control both the rotation and inclination of the mirror to center $\lambda 2$ on the quad detector. Since the beams $\lambda 1$ and $\lambda 2$ are parallel at the MEMS switch interface and on the mirror, the optimal positioning of the lightwave at $\lambda 2$ results in an optimal coupling of the lightwave at $\lambda 1$ to the output fiber. Two-axis correction of the MEMS mirror described above requires the individual MEMS mirror assemblies to have a rotary stage (as may be done by known means) to compensate for hinge-related alignment degradation.

In an alternative embodiment, the rotary stage arrangement can also be used for wavelength selection by etching diffraction gratings on the MEMS mirror surface.

A GRISM is a class of optical devices that combine the physical and spectral dispersion properties of a prism with that of a diffraction grating. In this embodiment, the fiber cladding surface (connecting to the indexed matched optical block) is cut on an angle suitable to induce beam refraction in the cladding similar to that of a regular prism. The arrangement is designed such that the desired beam exits the cladding and enters the "fiber indexed matched" glass block perpendicular to the common mating surface, thereby minimizing further refraction.

In a variant configuration, a selective transmissive grating is applied to the GRISM in areas that confront the oblique surface of the cladding to enhance the beams' refractive effect as needed. The embodiment has a specific goal of routing the cladding transmitted beams to a suitable detector outside of the fiber structure. A suitable optical bonding compound is used to join all surfaces.

Having described preferred embodiments of a novel mirror control for a micro-electro-mechanical optical cross connect switch (which are intended to be illustrative and not limiting), it is noted that modifications and variations can be made by persons skilled in the art in light of the above teachings. For example, although a 4 by 4 switch is illustrated, skilled persons in light of the above teaching will know how to make a different sized cross connect optical switch. Although a 4 by 4 switch is illustrated, skilled persons in light of the above teaching will know how to make other types of switches such as a single pole double throw, double pole single throw or double pole double throw switch. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. An optical switch comprising:
    an input optical fiber;
    an output optical fiber;
    a mirror that is positionable to reflect a lightwave signal from the input optical fiber into the output optical fiber; and
    a control circuit to sense a misalignment error and adjust the mirror to correct the misalignment error;
    the control circuit includes input and output calibration fibers co-parallel with respective input and output optical fibers;
    the input calibration fiber is displaced with respect to the input optical fiber, both fibers being in a first plane that is perpendicular to a plane of the substrate; and
    the output calibration fiber is displaced with respect to the output optical fiber, both fibers being in a second plane that is perpendicular to the plane of the substrate.

2. The optical switch of claim 1, wherein:
    the mirror that is positionable is inclinable;
    the misalignment error is an inclination misalignment error; and
    the control circuit adjusts the mirror to correct the inclination misalignment error.

3. The optical switch of claim 1, wherein:
    the mirror that is positionable is rotatable;
    the misalignment error is a rotation misalignment error; and
    the control circuit adjusts the mirror to correct the rotation misalignment error.

4. The optical switch of claim 1, wherein:
    the mirror that is positionable is inclinable and rotatable;
    the misalignment error includes an inclination misalignment error and a rotation misalignment error; and
    the control circuit adjusts the mirror to correct the inclination misalignment error and the rotation misalignment error.

5. The optical switch of claim 1, wherein the control circuit further includes:
    a receiver portion to detect an optical calibration signal from the output calibration fiber; and
    a controller portion to adjust the mirror to correct the misalignment error according to the detected optical calibration signal.

6. The optical switch of claim 5, wherein the input optical fiber, the output optical fiber, the input calibration fiber, the output calibration fiber, the receiver portion and the mirror are arranged so that when the receiver portion indicates that the mirror optimally reflects the optical calibration signal into the output calibration fiber, the mirror simultaneously optimally reflects the lightwave signal from the input optical fiber into the output optical fiber.

7. The optical switch of claim 1, wherein the output calibration fiber constitutes a first output calibration fiber and the control circuit further includes:
    a second output calibration fiber co-parallel with the first output calibration fiber, the second output calibration fiber being displaced with respect to the first output calibration fiber, both fibers being in the second plane;
    a receiver portion to detect first and second optical calibration signals from the respective first and second output calibration fibers; and
    a controller portion to adjust the mirror to correct the misalignment error according to the detected first and second optical calibration signals.

8. The optical switch of claim 1, wherein the first and second planes are substantially perpendicular.

9. The optical switch of claim 3, further comprising a substrate on which the mirror is rotatably mounted, wherein:
    the control circuit includes input and output calibration fibers co-parallel with respective input and output optical fibers;
    the input calibration fiber is displaced with respect to the input optical fiber, both fibers being in a first plane that is perpendicular to a plane of the substrate; and
    the output calibration fiber is displaced with respect to the output optical fiber, both fibers being in a second plane that is perpendicular to the plane of the substrate.

10. The optical switch of claim 9, wherein the control circuit further includes:

a receiver portion to detect an optical calibration signal from the output calibration fiber; and a controller portion to adjust the mirror to correct the rotation misalignment error according to the detected optical calibration signal.

11. The optical switch of claim 10, wherein the input optical fiber, the output optical fiber, the input calibration fiber, the output calibration fiber, the receiver portion and the mirror are arranged so that when the receiver portion indicates that the mirror optimally reflects the optical calibration signal into the output calibration fiber, the mirror simultaneously optimally reflects the lightwave signal from the input optical fiber into the output optical fiber.

12. The optical switch of claim 9, wherein the output calibration fiber constitutes a first output calibration fiber and the control circuit further includes:

a second output calibration fiber co-parallel with the first output calibration fiber, the second output calibration fiber being displaced with respect to the first output calibration fiber, both fibers being in a third plane that is co-parallel with the plane of the substrate;

a receiver portion to detect first and second optical calibration signals from the respective first and second output calibration fibers; and a controller portion to adjust the mirror to correct the rotation misalignment error according to the detected first and second optical calibration signals.

13. The optical switch of claim 9, wherein the first and second planes are substantially perpendicular.

14. The optical switch of claim 4, further comprising a substrate on which the mirror is hingedly and rotatably mounted, wherein:

the control circuit includes input and output calibration fibers co-parallel with respective input and output optical fibers;

the input calibration fiber is displaced with respect to the input optical fiber, both fibers being in a first plane that is perpendicular to a plane of the substrate; and the output calibration fiber is displaced with respect to the output optical fiber, both fibers being in a second plane that is perpendicular to the plane of the substrate.

15. An optical switch comprising:

an input switch fiber that includes an input core and an input cladding;

an output switch fiber that includes an output core and an output cladding;

an input GRISM to insert a calibration signal into the input cladding;

a mirror that is adjustable, the mirror reflecting a lightwave signal from the input core into the output core and reflecting the calibration signal from the input cladding into the output cladding; and an output GRISM to extract the calibration signal from the output cladding.

16. The optical switch of claim 15, wherein an index of refraction of the input core is substantially equal to an index of refraction of the input GRISM at a wavelength of the lightwave signal.

17. The optical switch of claim 15, wherein an index of refraction of the output core is substantially equal to an index of refraction of the output GRISM at a wavelength of the lightwave signal.

18. The optical switch of claim 17, wherein an index of refraction of the input core is substantially equal to an index of refraction of the input GRISM at the wavelength of the lightwave signal.

19. The optical switch of claim 18, wherein the index of refraction of the input core is substantially equal to the index of refraction of the output core.

20. The optical switch of claim 15, wherein the input GRISM includes:

a first surface through which the calibration signal enters that is substantially perpendicular to a transit direction of the calibration signal in the input GRISM; and a second surface through which the calibration signal exits that is oblique to the transit direction of the calibration signal in the input GRISM and is oblique to a transit direction of the lightwave signal in the input core, the second surface being oriented so that the transit direction of the calibration signal in the input GRISM is diffracted to a cladding transit direction that is parallel to the transit direction of the lightwave signal in the input core.

21. The optical switch of claim 20, wherein:

the input cladding includes an oblique surface that confronts the second surface; and the oblique surface of the input cladding has etched thereon a diffraction grating to diffract the calibration signal in the input GRISM into the cladding transit direction at a wavelength of the calibration signal.

22. The optical switch of claim 20, wherein a ratio of an index of refraction of the input cladding and an index of refraction of the input GRISM at a wavelength of the calibration signal causes the calibration signal in the input GRISM to diffract to the cladding transit direction.

23. The optical switch of claim 20, wherein:

the input cladding includes an oblique surface that confronts the second surface;

the oblique surface of the input cladding has etched thereon a diffraction grating; and a ratio of an index of refraction of the input cladding and an index of refraction of the input GRISM at a wavelength of the calibration signal and the diffraction grating diffracts the calibration signal in the input GRISM into the cladding transit direction at a wavelength of the calibration signal.

24. The optical switch of claim 15, wherein a cladding transit direction of the calibration signal in the output cladding is parallel to a core transit direction of the lightwave signal in the output core, and wherein the output GRISM includes:

a first surface through which the calibration signal exits that is substantially perpendicular to a transit direction of the calibration signal in the output GRISM; and a second surface through which the calibration signal enters that is oblique to the transit direction of the calibration signal in the output GRISM and is oblique to the core transit direction, the second surface being oriented so that the transit direction of the calibration signal in the output GRISM is diffracted to the cladding transit direction.

25. The optical switch of claim 24, wherein:

the output cladding includes an oblique surface that confronts the second surface of the output GRISM; and the oblique surface of the output cladding has etched thereon a diffraction grating to diffract the calibration signal in the output cladding into the transit direction of the calibration signal in the output GRISM.

26. The optical switch of claim 24, wherein a ratio of an index of refraction of the output cladding and an index of refraction of the output GRISM at a wavelength of the calibration signal causes the calibration signal in the output cladding to diffract to the transit direction of the calibration signal in the output GRISM.

27. The optical switch of claim 24, wherein:
the output cladding includes an oblique surface that confronts the second surface of the output GRISM;
the oblique surface of the output cladding has etched thereon a diffraction grating; and
a ratio of an index of refraction of the output cladding and an index of refraction of the output GRISM at a wavelength of the calibration signal and the diffraction grating diffracts the calibration signal in the output cladding to the transit direction of the calibration signal in the output GRISM at a wavelength of the calibration signal.

28. The optical switch of claim 15, further comprising a control circuit to sense a misalignment error based on the extracted calibration signal, the misalignment error including at least one of an inclination misalignment error and a rotation misalignment error, the control circuit including circuitry to adjust the mirror to correct the misalignment error.

29. A method comprising steps of:

propagating a lightwave signal in an input core of an input switch fiber;

inserting a calibration signal through an input GRISM into an input cladding of the input switch fiber;

reflecting the lightwave signal from the input core off an adjustable mirror into an output core of an output switch fiber while reflecting the calibration signal from the input cladding off the adjustable mirror into an output cladding of the output switch fiber;

extracting the calibration signal in the output cladding through an output GRISM;

sensing a misalignment error based on the extracted calibration signal, the misalignment error including at least one of an inclination misalignment error and a rotation misalignment error; and adjusting the mirror to correct the misalignment error.

* * * * *